Figure 1:
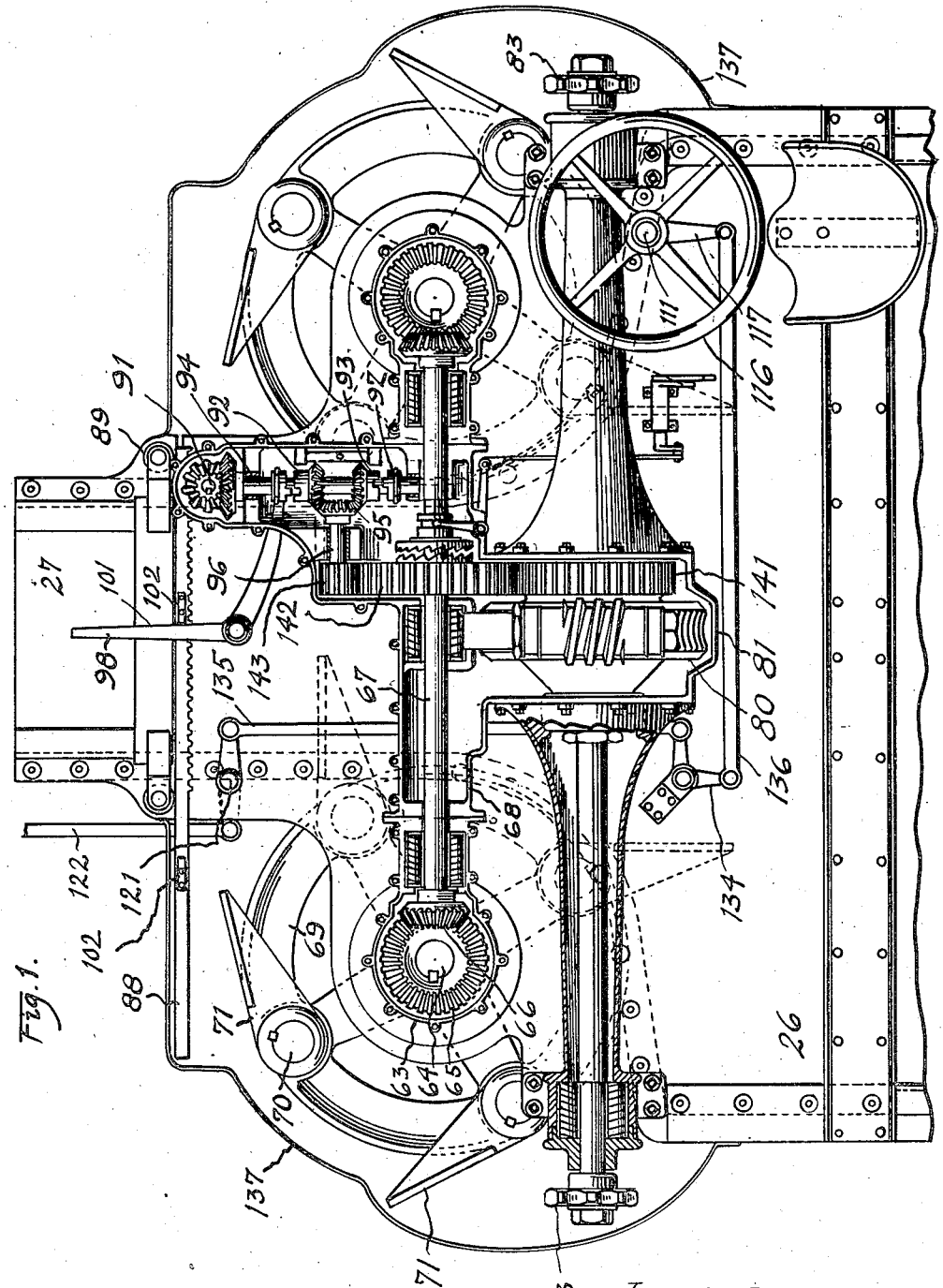

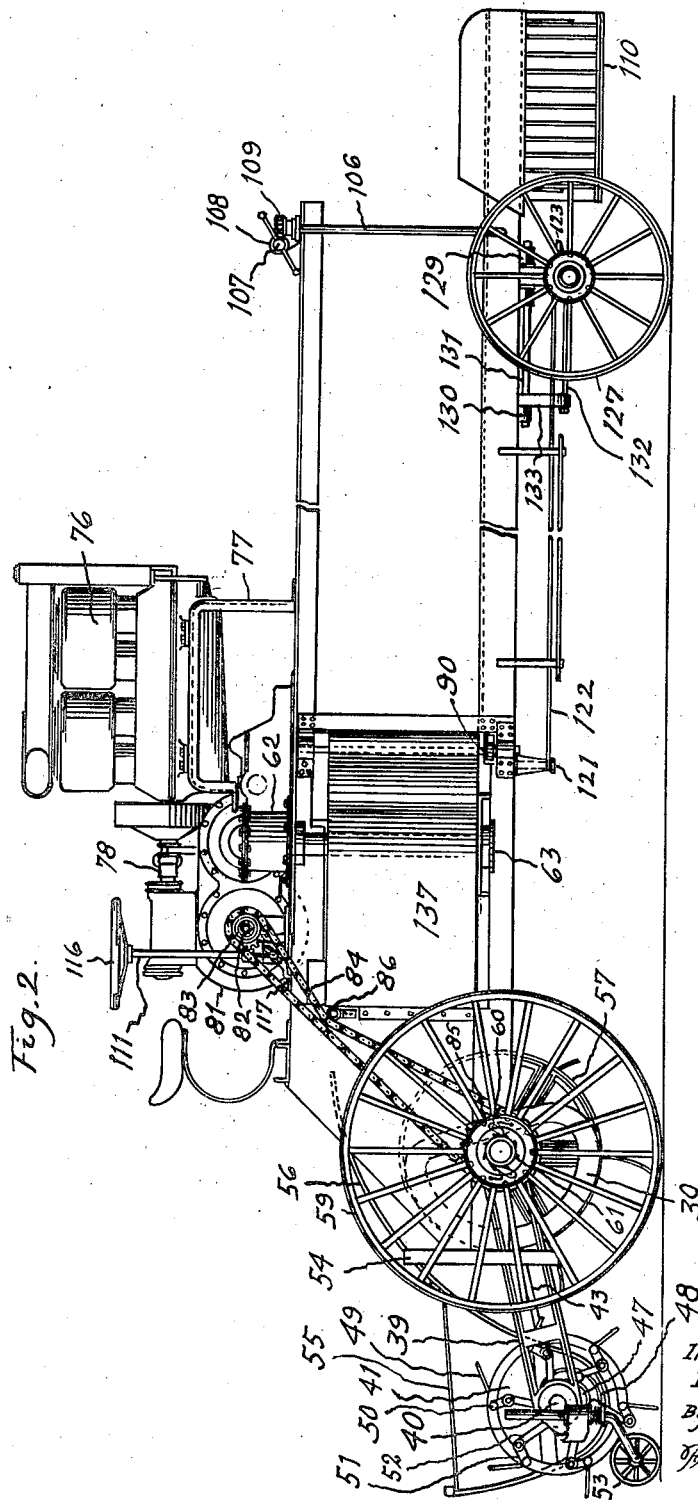

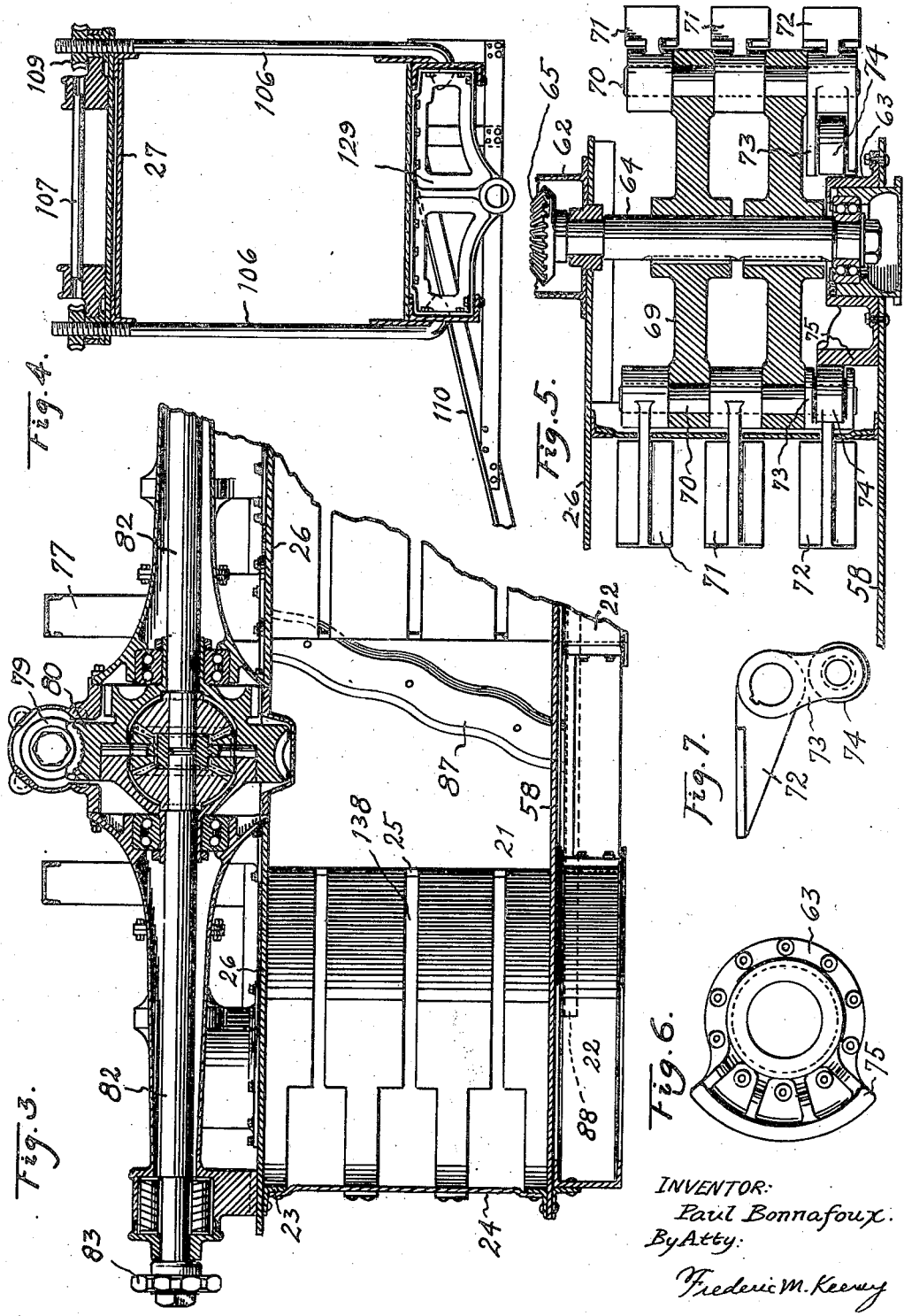

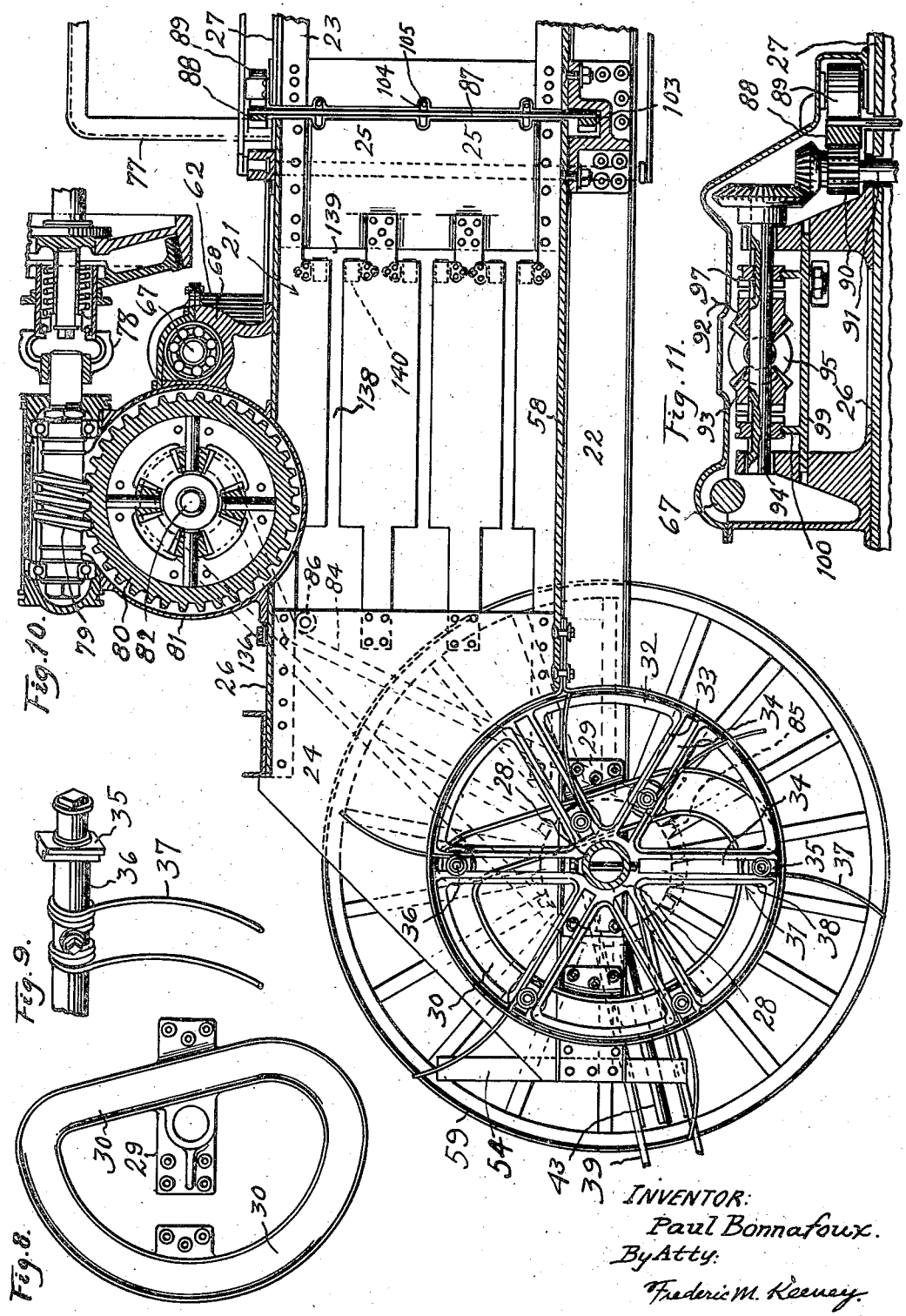

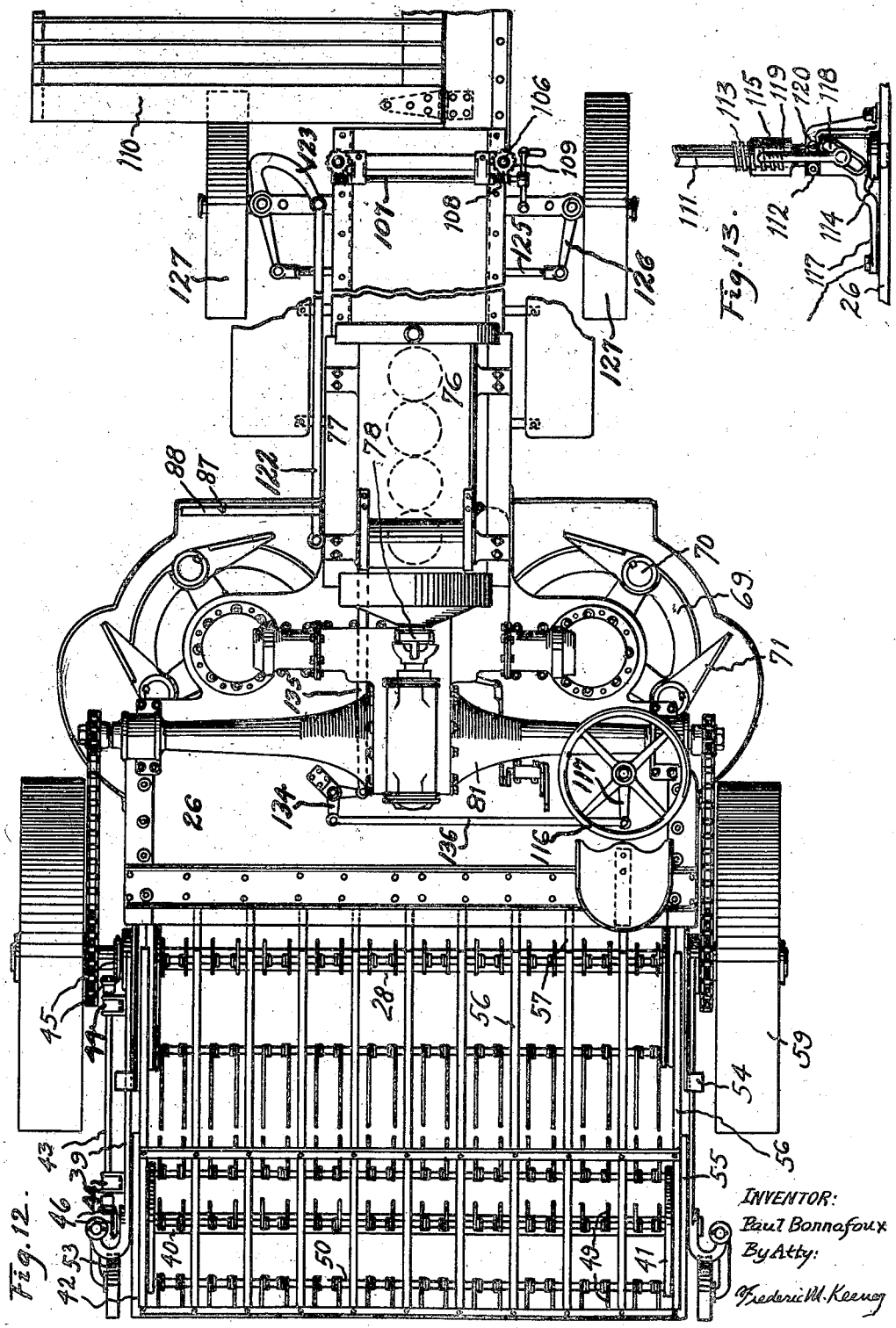

Patented June 3, 1924.

1,496,363

UNITED STATES PATENT OFFICE.

PAUL BONNAFOUX, OF LANCASTER, CALIFORNIA.

AUTOMATIC HAY BALER.

Application filed June 11, 1921. Serial No. 476,900.

*To all whom it may concern:*

Be it known that I, PAUL BONNAFOUX, a citizen of the United States, residing at Lancaster, in the county of Los Angeles and State of California, have invented a new and useful Automatic Hay Baler, of which the following is a specification.

This invention has relation to an improved hay-baler, and its objects are to provide an improved construction whereby the hay may be gathered from the ground and compressed into bales as the machine advances along the ground.

Other objects are to provide improved compressor elements and a knife to cut the compressed hay into bales.

Attainment of the objects of the invention is effected by constructing an improved compressing chamber, and by simplifying the gearing which transmits the power from the motor to the compressing elements.

In the drawings, Figure 1 is a fragmentary and top plan view of my improved hay-baler, which shows portions of the gear case in section. Fig. 2 is a side elevation of the device. Fig. 3 is a sectional and detail view of the baling chamber and the differential transmission elements. Fig. 4 is a transverse view of the forward end of the baling chamber. Fig. 5 is a sectional detail view of a rotary compressor. Fig. 6 is a detail plan view of the cam which operates the compressor fingers to operative and inoperative positions. Fig. 7 is a detail view of a compressor finger provided with a roller to engage with the operating cam. Fig. 8 is a side view of the cam which operates the rake teeth to operative position. Fig. 9 is a fragmentary and perspective view of a rake tooth bar. Fig. 10 is a fragmentary and longitudinal sectional view of the baling chamber. Fig. 11 is a fragmentary and detail view of the knife operating mechanism. Fig. 12 is a top plan view of the device with the central portion of the compressing chamber broken away. Fig. 13 is a fragmentary and detail view of the steering shaft.

Assuming the invention to be embodied as illustrated, the main baling chamber 21, has sides converging forwardly to compress the hay, and is formed by sills 22, upper frame members 23, and side plates 24 and 25. Top plate 26 at the rear, and top plate 27 at the forward end, are secured to members 23. The main axle 28 is journalled in bearing members 29, secured to frame members 22, and further provided with roller guides 30. A rotary feeder 31 is mounted on axle 28, and consists of end members 32, having slotted spokes 33 having radial slots 34, in which slide the blocks 35, fixed to tooth-bars 36. The tooth-bars therefore, slide in and out relative to the main axle, but do not rotate. Tooth-bars 36 are provided with spring rake teeth 37, and with rollers 38 in engagement with roller guides 30, so that as the spider elements 32 are rotated, the tooth-bars will slide in and out relative to the main axle 28.

The auxiliary frame members 39, pivotally connected to the main axle, have journalled therein the auxiliary feeder shaft 40 and the end plate 41 and spider 42, fixed to shaft 40. A countershaft 43 is journalled in bearings 44, on the left auxiliary frame member. Gear members 45 transmit motion from the main shaft to the countershaft 43, and gear members 46, from the countershaft to auxiliary shaft 40. An eccentric bearing 47 is formed integral with the right auxiliary frame member, and a collar 48 rotates thereon. Teeth 49, are mounted on bars 50, provided with lever-arms 51, connected by links 52, with collar 48. Castor wheels 53, support frame members 39. The frame members 39 are maintained in alignment by guides 54, on frame members 22. A tiltable frame 55 is pivotally mounted on auxiliary frame members 39, and has secured thereto, the cleaners 56, adapted to strip the hay from both rake feeders and to guide the hay over the annular cleaners 57, encircling the main feeder, and connected to the bottom chamber plate 58. The arrangement is such that the feeders rotate in contrary directions, and the eccentric bearing 47, actuates the rake teeth 49 to inoperative position, so that they are withdrawn in a practically horizontal plane as they pass from between the strippers. The master-wheels 59, through ratchet pawls 60 and ratchet wheels 61, serve to rotate the main shaft when the machine is advancing, and thus operate both rotary feeders simultaneously.

Bearing members 62 and 63, have journalled therein the compressor shafts 64, provided with bevel-gears 65, driven by bevel-pinions 66, on countershaft 67, journalled in casing 68. Shafts 64 have fixed spiders 69, in which are journalled the finger shafts 70, on which are mounted compressor fingers 71 and 72. Fingers 72 have lugs 73, in which are journalled the rollers 74, which engage with cams 75, integral with bearings 63, to hold the fingers in operative position during a portion of the revolution of spiders 69.

A motor 76, mounted on supporting members 77, above the baling chamber, through clutch 78, drives the worm 79, in mesh with the differential member 80, mounted in casing 81, and driving the differential shafts 82, provided with sprocket pinions 83, connected by chains 84, with sprockets 85, on the master-wheels. Chains 84 pass over idler rollers 86, and therefore, the differential shafts and casing 81, are relatively fixed in position.

A knife 87 operates transversely through the compressing chamber, and is provided at the top and bottom with rack members 88, which bear against the rollers 89. These rack members are driven by spur pinions 90, on shaft 91. Clutch pinions 92 and 93, are loosely mounted to rotate independently on clutch shaft 94, and are driven by pinion 95, on a shaft 96. Clutch members 97 may be thrown into engagement with clutch pinions 92 and 93. A lever 98 may be manually operated to shift the clutch members 97, said lever being loosely connected to the clutch fork member 99, slidingly mounted in the casing, and having clutch forks 100 in engagement with members 97. The free arm 101, of lever 98, rests upon the upper knife rack member, which is provided with lugs 102. The lower knife rack is provided with rollers 103, which permit the knife and the rack members to be operated easily. As the knife approaches the limit of its stroke in either direction, the clutch lever 98 is shifted to inoperative position by one of the lugs 102, and in either inoperative position, abuts against a lug on the knife rack member, which prevents manipulation of the lever to a wrong position by the operator. The projections 104, on the knife, are provided with holes 105, and as the knife cuts the compressed hay into suitable lengths for bales, binding wires, such as are now in use and provided with a looped end, having been previously inserted in the holes 105, are drawn through the channels cut in contiguous ends of the bales by the projections 104. The tying operation may be completed by the operators as the bale advances along the constricted portion of the bailing chamber. For constricting the forward end of the baling chamber, I provide threaded bars 106, extending from the bottom to the top of the chamber, and further provide a crank 107, to be manipulated by the operator, the crank having worm pinions 108 in engagement with gears 109, on the threaded bars 106, whereby through manipulation of the crank 107, the chamber may be further constricted to compress the bale after the tying operation. The inclined chute 110, receives the bales and deposits them on the ground and out of the path of the rotary feeders.

The steering means comprise a shaft 111, journalled in the top plate 26 and in the standard 112, and having a worm threaded portion 113, and a flange 114. A traveling nut 115 is in engagement with the threaded portion 113, and a steering wheel 116, is provided for rotating the shaft. A lever 117, is mounted to rotate independently on the steering shaft 111, and is provided with spirally arranged slots 118, and the arms 119, working between rollers 120, engage with spiral slots 118. The longitudinal motion of the traveling nut 115, therefore operates the lever 117 through its steering arc. The vertically disposed rock-shaft 121 is connected by a drag-link 122, with lever 123, on the steering knuckle 124, which is connected by tie-bar 125, with steering knuckle 126. The front wheels 127, are rotatively mounted relative to the steering knuckles, which are pivotally mounted at opposite ends of front axle 128. The pedestal 129, and bracket 130 support the shaft 131, and the front axle is pivotally connected thereto. Reach rods 132 extend from the front axle to member 133, pivotally mounted on shaft 131. A bell-crank lever 134 is mounted on the top plate 26, and links 135 and 136, connected, respectively, to the bell-crank lever and rock shaft 121, and to the bell-crank lever and steering arm 117, transmit the steering movement to the wheels.

Referring to the compressing means, I provide shields 137 for the compressing fingers 71 and 72. I have provided the baling chamber with relatively narrow slots 138, for the passage of the compressing fingers, the slots having enlargements 139, for the exit of the fingers from the compressing chamber. As the finger rollers 74 become disengaged from the cams 75, the thrust of the fingers is taken by rollers 140, adjacent to the exit slots 139.

The differential gear member 80, is provided with an integral spur-gear wheel 141, in mesh with a similar spur-gear wheel 142, on jack-shaft 67, which, through pinions 66, and gears 65, drive the compressor shafts. Gear-wheel 142, is in mesh with a pinion 143, on shaft 96, thereby serving to operate the knife, when the knife clutch lever 98 is shifted to operative position.

From the foregoing it may be seen that I have provided an efficient device in which the function of baling hay is performed continuously as the device advances along the ground to gather up the hay therefrom.

What is claimed is:

1. In a hay-baler, a frame enclosing a baling chamber, said chamber being open at the front and rear ends and constricted in the forward part thereof, rotary feeders to convey the hay into the baling chamber at the rear end thereof, strippers interposed between the feeders, rotary compressors, one on each side of the baling chamber, compressing fingers on the compressors and adapted to extend into the baling chamber during a portion of the revolution thereof, means for actuating the rotary compressors, and cam members to force the fingers into operative position within the baling chamber, the compressor fingers being released as they approach the constricted portion of the compressing chamber.

2. In a hay-baler, a frame enclosing a baling chamber which is open at the front and rear ends, and converging at the forward end, rotary compressors adjacent to the baling chamber, means for actuating the compressors, fingers on the compressors, means for forcing the fingers to operative position during a part of their revolution, said fingers extending into the baling chamber in their operative position, and rollers exteriorly mounted relative to the compressing chamber, and supporting the fingers as they are withdrawn from the baling chamber.

3. In a hay-baler, a frame enclosing a baling chamber open at the rear and forward ends, and converging at the forward end, rotary compressors adjacent to the baling chamber, means for actuating the compressors, fingers on the compressors, a cam for forcing the fingers to operative position during a part of the revolution thereof, said fingers extending into the baling chamber during a part of their revolution, and rollers arranged to support the fingers as they are withdrawn from the compressing chamber.

4. In a hay-baler, a frame enclosing the baling chamber open at the rear and forward ends, said chamber converging at the front end and having a series of longitudinal slots in each side, said slots being enlarged at each end to form entrance and exit ports, rotary compressors adjacent to and exterior to the baling chamber, means for actuating the rotary compressors, fingers on the rotary compressors, cams operative to force the fingers into said slots during a part of the revolution of the compressors, said fingers swinging through an arc in the compressing chamber, and rollers adjacent to the forward ports of exit, and supporting the fingers as they are withdrawn from the chamber.

5. In a hay-baler, a compressing chamber open at the front and rear ends and converging to form a constricted portion for the greater portion of its length, said chamber having a series of longitudinal slots in its sides, rotary compressors adjacent to the baling chamber, means for actuating the compressors, fingers on the compressors, cams to operate the fingers into operative position during a portion of the revolution of the compressors, said fingers extending through the slots into the chamber in operative position, and rollers adjacent to the exit ports to receive the thrust of the fingers as they are released by said cams.

6. In a hay-baler, a compressing chamber open at the front and rear ends and having a constricted portion for the greater part of its length, said chamber having vertical slots at the beginning of its constricted portion, rotary compressors adjacent to the chamber, fingers on the compressors, cams for actuating the fingers to operative position within the chamber during a part of the revolution of the compressors, a knife adapted to move transversely through the chamber and passing through the vertical slots as it approaches the limit of its stroke in either direction, means for actuating the knife, a clutch to control the knife-actuating means, a lever to operate the clutch to operative and inoperative positions, and lugs carried by the knife-actuating means to shift the lever in inoperative position as the knife approaches the limit of its stroke.

7. In a hay-baler, plates forming the top, bottom and sides of a baling chamber, means for feeding hay into the rear thereof, means for compressing the hay within the chamber, a knife sliding transversely through the chamber to sever the hay into bales, and having oppositely disposed cutting edges, said knife being inclined relative to the section of the compressing chamber, means for operating the knife alternately in opposite directions, a clutch to throw the knife-operating means into operative position, and means for disengaging the clutch as the knife approaches the limit of its stroke.

8. The combination with hay gathering means, of compressing means operative upon the hay subsequent to the gathering means, severing means for the compressed hay operative subsequent to the compressing means, and means for constricting the compressed hay and operative subsequent to the severing means.

9. In a hay-baler, a frame enclosing a baling chamber and converging to form a constricted section for the greater portion of its length, means for feeding the hay into the chamber at the rear, rotary compressing elements to force the hay to the front of the chamber, and severing means located in the chamber adjacent to the compressing elements.

10. In a hay-baler, a frame enclosing a baling chamber, means for feeding the hay into the chamber at the rear, means for compressing the hay within the chamber, a knife adapted to move transversely relative to the frame and sever the compressed hay, a clutch to control the knife actuating means, means for actuating the knife alternately in opposite directions, rack members attached to the knife, rollers supporting the rack members in engagement with the actuating means, and lugs on the upper rack member to shift the clutch lever to inoperative position as the knife approaches the limit of its stroke.

11. In a hay-baler, a frame enclosing a baling chamber, master-wheels supporting the frame, a main shaft journalled in the frame, ratchet wheels on the main shaft, pawls on the master-wheels and arranged for rotation of the main shaft upon rotation of the master-wheels for forward movement, rotary drums integral with the main shaft, and having radial slots, crossheads sliding in said slots in the drums, tooth-bars carried by the sliding crossheads, rake teeth carried by the tooth-bars and adapted to feed the hay into the chamber, rollers mounted to independently rotate on the tooth-bars adjacent to the crossheads, guide members fixed to the frame and engaging with the rollers on the tooth bars to retract the teeth as they pass the chamber, compressing means within the chamber and operative as the hay is received from the rake teeth, and severing means operative subsequent to the compressing means.

12. In a hay-baler, a frame enclosing a baling chamber, master-wheels supporting the frame, an auxiliary frame pivotally connected to the main frame, a rotary rake member mounted in the main frame and driven by the master-wheels, an auxiliary rake member mounted on the auxiliary frame, means whereby the auxiliary rake is driven with rotary movement contrary to the rotary movement of the main rake member, rotary compressing members, means for actuating them in opposite rotary directions, and means for compressing the hay subsequently by constricting the chamber, and severing means operative subsequent to the rotary compressor.

13. In a hay-baler, the combination with plates forming the top, bottom and sides of a compressing chamber, means for feeding the hay into the rear thereof, and means for compressing the hay within the chamber, of a knife sliding transversely through the chamber to sever the hay into bales, said knife having oppositely disposed cutting edges, and being inclined relative to the section of the baling chamber, rack members fixed to the top and bottom of the knife, a vertical shaft mounted on the exterior of the chamber and adjacent thereto, pinions on the vertical shaft in engagement with the rack members, a horizontally disposed clutch shaft mounted above the baling chamber, a gear and pinion operatively connecting the vertical shaft and the clutch shaft, rollers supporting the bottom rack member, rollers mounted on the top of the chamber and bearing against the upper rack member, independently revoluble pinions mounted on the clutch shaft and having integral clutch elements, means for actuating the independently revoluble pinions in opposite directions, clutch members feathered to the clutch shaft, a clutch rod sliding beneath the clutch shaft, forks thereon and in engagement with the sliding clutch members, a bell-crank lever arranged to shift the clutch rod alternately in opposite directions, said lever having its free end extending over the upper rack member, and cams on the upper rack member to shift the lever to inoperative position as the knife approaches the limit of its stroke.

14. In a hay-baler, plates forming the top, bottom and sides of a baling-chamber, means for feeding the hay into the rear thereof, means for compressing the hay within the chamber, a knife sliding transversely through the chamber to sever the hay into bales, oppositely disposed cutting edges on the knife, said knife being inclined relative to the section of the chamber, projections on opposite sides of the knife, having apertures to receive the ends of the baling wires, means for operating the knife alternately in opposite directions, a clutch mechanism to throw the knife actuating mechanism into operation, and means for disengaging the clutch as the knife approaches the limit of its stroke.

In testimony whereof, I hereunto affix my signature.

PAUL BONNAFOUX.